United States Patent
Farris et al.

Patent Number: 5,120,151
Date of Patent: Jun. 9, 1992

[54] ROLLER GUIDE ALIGNMENT FOR A VEHICLE DOOR

[75] Inventors: Timothy M. Farris, Sterling Heights; Lowell W. Satterlee, Clarkston; Dante C. Zuccaro, Allenton; Richard Pelachyk, Utica, all of Mich.

[73] Assignee: General Motors Corporation, Detroit, Mich.

[21] Appl. No.: 750,564

[22] Filed: Aug. 26, 1991

[51] Int. Cl.[5] ............................................. F16D 1/00
[52] U.S. Cl. ....................................... 403/24; 403/13; 403/381; 16/93 R; 49/441
[58] Field of Search ............ 16/93 R, 93 D; 49/441, 49/428, 414; 403/14, 13, 381, 24

[56] References Cited

U.S. PATENT DOCUMENTS

| | | | |
|---|---|---|---|
| 3,466,802 | 9/1969 | Doveinis et al. | 49/428 |
| 3,466,803 | 9/1969 | Packett | 49/441 |
| 4,882,805 | 11/1989 | Campbell et al. | 16/93 |

FOREIGN PATENT DOCUMENTS 3842051 12/1989 Fed. Rep. of Germany ...... 403/381

*Primary Examiner*—Andrew V. Kundrat
*Attorney, Agent, or Firm*—Charles E. Leahy

[57] ABSTRACT

The vehicle door has a mounting panel with a track formed therein by integral flanges struck from the panel. The window regulator arm has a roller carried thereon for engaging with the track to permit movement of the roller along the panel. The track has an open end permitting entry of the roller into the track when the roller has obtained both axial and cross-track alignment with the track. In order to facilitate installation of the roller into the track, the roller has an end face and the panel has an integral portion thereof underlying the open end of the track and being engaged by the end face of the roller to establish the roller in a position of axial alignment with the panel from which the roller may be easily entered into the open end of the track. In addition, the roller may have a circumferential extending face thereof and the integral portion of the panel underlying the open end of the track may be a depression having walls thereof adapted for engagement by the circumferential extending face of the roller to establish the roller in a position of cross-track alignment with the track, so that the roller may be easily entered into the track.

4 Claims, 3 Drawing Sheets

ROLLER GUIDE ALIGNMENT FOR A VEHICLE DOOR

The invention relates to a vehicle door and provides a mounting panel for the window regulator from which an integral track is struck for receiving a roller carried by the window regulator arm.

BACKGROUND OF THE INVENTION

It is well known in vehicle bodies to provide a vehicle door which carries a window regulator for raising and lowering a window. The window regulator is typically comprised of a lift arm operated by a motor and has an end connected to a sash channel carried by the window glass. The lift arm is supported in its movement by a regulator arm having one end pivoted to the lift arm and the other end carrying a roller slidably engaged in a track carried by the mounting panel. It is known that the track in the mounting panel may be economically provided as an integral one-piece construction with the mounting panel by striking opposed facing flanges from the panel, each flange having a leg projecting away from the panel and an inturned flanged facing toward the inturned flange of the other flange to define the track. The track so formed is open at least one end so that the roller of the regulator arm may be installed into the track upon assembly of the vehicle door. The roller preferably has a circumferential extending groove therein which captures the inturned flanges of the track to capture the roller within the track.

Although the aforedescribed integral track construction is economical, it would be desirable to further improve the construction of such a vehicle door by enhancing the ease with which the roller of the regulator arm may be installed into the open end of the track.

SUMMARY OF THE INVENTION

According to the invention the vehicle door has a mounting panel with a track formed therein by integral flanges struck from the panel. The window regulator arm has a roller carried thereon for engaging with the track to permit movement of the roller along the panel. The track has an open end permitting entry of the roller into the track when the roller has obtained both axial and cross-track alignment with the track. In order to facilitate installation of the roller into the track, the roller has an end face and the panel has an integral portion thereof underlying the open end of the track and being engaged by the end face of the roller to establish the roller in a position of axial alignment with the panel from which the roller may be easily entered into the open end of the track. In addition, the roller may have a circumferential extending face thereof and the integral portion of the panel underlying the open end of the track may be a depression having walls thereof adapted for engagement by the circumferential extending face of the roller to establish the roller in a position of cross-track alignment with the track, so that the roller may be easily entered into the track.

These and other objects and features and advantages of the invention will become apparent upon consideration of the description of the preferred embodiment and the appended drawings in which.

DESCRIPTION OF THE PREFERRED EMBODIMENT

Figure 1:
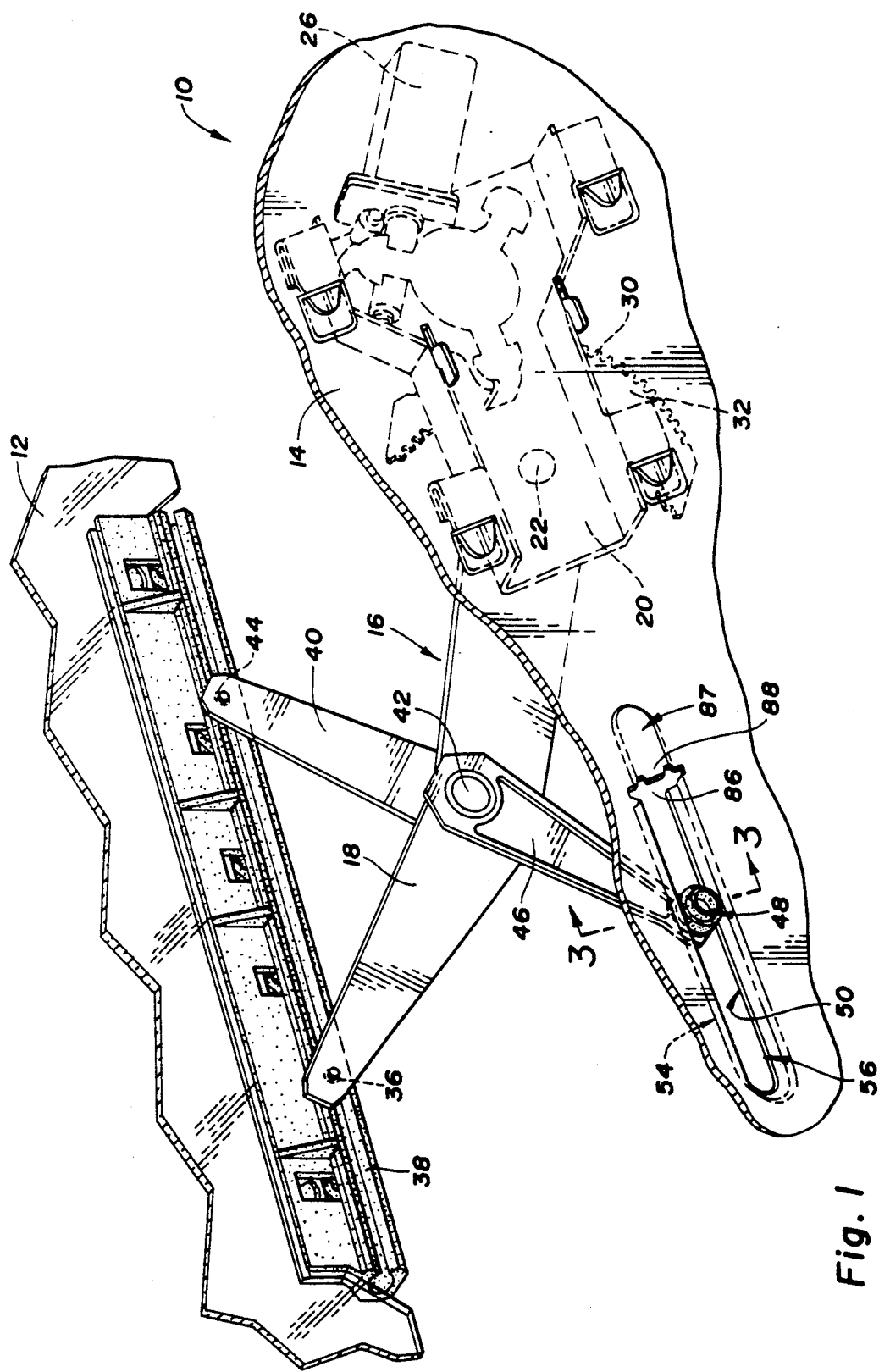
FIG. 1 is a perspective view of a motor vehicle door having parts broken away and in section and having a roller carried by the regulator arm and engaged within an integrally formed track on the door mounting panel.

FIG. 1 is a perspective view of a vehicle door (10) in which a window panel (12) is mounted upon a mounting panel (14) by a window regulator assembly generally indicated at (16). The window regulator assembly (16) includes a lift arm (18) which is mounted on a mounting bracket (20) by a pivot pin (22). An electric motor drive assembly (26) is also mounted on the mounting bracket (20) and has a gear, not shown, which meshes with gear teeth (30) carried on a sector (32) attached to the lift arm (18). Accordingly, energizing the electric motor drive unit (26) will cause the lift arm (18) to be pivoted up and down about the pivot pin (22).

The end of the lift arm (18) carries a roller (36) which is captured within a sash channel (38) attached to the lower edge of the window panel (12). A regulator arm (40) has a lower end pivot to the lift arm by pivot (42) and an upper end carrying a roller (44) captured within the sash channel (38). A regulator arm (46) has an upper end pivoted to the lift arm (18) by the pivot (42) and a lower end which carries a roller (48) captured in a track (50) provided in the mounting panel (14).

Figure 3:
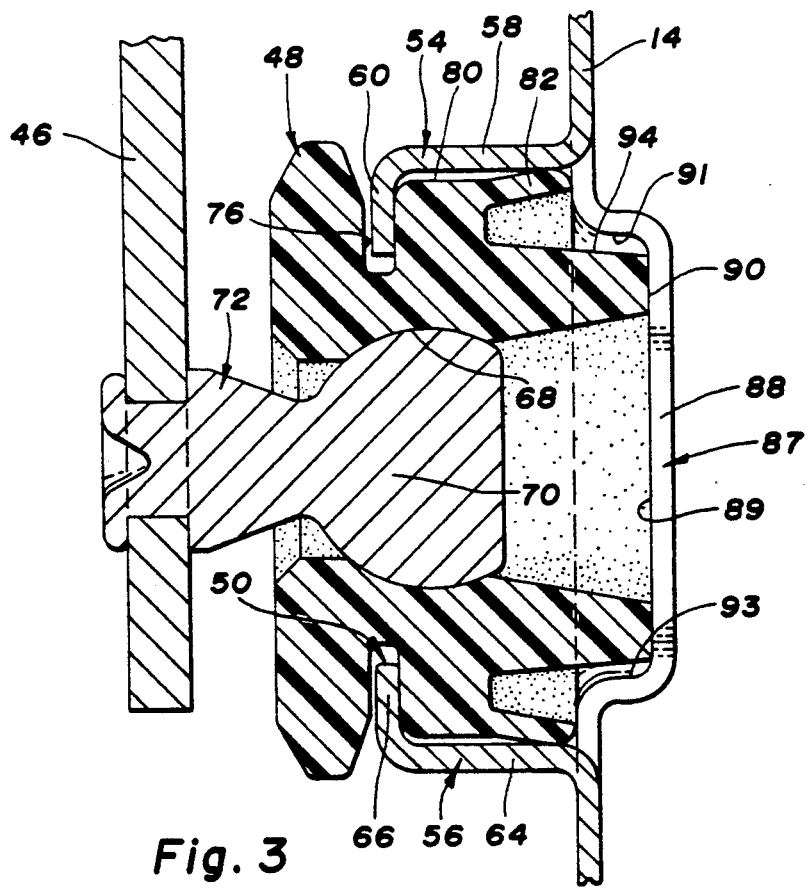
FIG. 3 is a section view taken in the direction of arrows 3—3 of FIG. 1.

Referring to FIG. 3 it is seen that the track (50) is formed integrally with the mounting panel (14) by stamping an upper flange (54) and a lower flange (56) from the mounting panel (14). The upper flange (54) includes a leg (58) bent to project normally away from the mounting panel (14) and having a downward extending inturned flange (60) at the end thereof. Likewise, the lower flange (56) has a leg (64) projecting normally away from the mounting panel (14) and an upward extending inturned flange (66) which faces toward the downturned flange (60) of the top flange (54).

The roller (48) is formed of injection molded plastic and has a spherical recess (68) therein which receives and seats a spherical head (70) of a pin (72) attached to the regulator arm (46). The roller (48) and pin (72) may swivel somewhat relative one another by virtue of the engagement of the spherical head (70) within the spherical seat (68). The roller (48) has a circumferential extending slot or recess (76) which receives the inturned flanges (60) and (66) of the track (50). This engagement of the inturned flanges within the recess (76) serves to locate the roller (48) in the axial direction within the track (50). The roller (48) also has an outer roller face (80) which obtains a close fitting relationship with the leg (58) of flange (54) and the leg (64) of the lower flange (56). The roller (48) preferably includes a circumferential extending lip (82) adjacent the outer roller face (80) which yieldably bears against the flanges (58)

and (64) in order to provide a rattle-free fit of the roller (48) within the track (50).

Referring, again, to FIG. 1 it is seen that the track (50) has an open end (86) through which the roller (48) has been installed during the assembly of the vehicle door. This installation of the roller (48) into the track (50) is facilitated by the provision of an integrally formed panel portion (88) of the mounting panel (14). As seen in FIGS. 1 and 3 this panel portion (88) is provided in the form of a cup-shaped depression (87) which is stamped into the panel (14) adjacent to and underlying the open end (86) of the track (50). The cup-shaped depression has a bottom wall (89) and sidewalls (91) and (93). As seen in FIG. 3 the roller (48) has an end face (90) which is provided to engage with the bottom wall (89) panel portion (88) in order to facilitate the entry of the roller into the track, as will be discussed hereinafter.

Figure 2A:
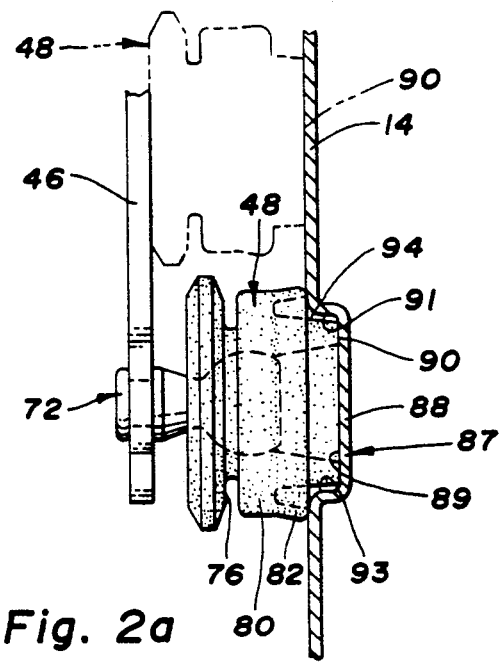
FIG. 2a is a section view taken through the track and showing the roller pressed into a depression integrally formed in the panel and underlying the open end of the track in order to align the roller with the track.

Referring to FIG. 2a, it will be understood that the assembly of the roller (48) into the track (50) is initiated by thrusting the roller (48) against the mounting panel (14) as shown in the phantom line indicated view so that the end face (90) of the roller (48) engages against the face of the mounting panel (14). Then, the assembler slides the roller (48) along the face of the panel (14) until the roller drops into the cup-shaped depression (87) shown in the solid line indicated position of FIG. 2a. As seen in FIG. 2a, the roller (48) has a circumferential guide face (94) which engages with the sidewalls (91) and (93) of the cup-shaped depression (87) to locate the roller (48) in the vertical direction while the engagement of the end face (90) with the bottom wall (89) positively locates the roller (48) in the axial direction.

Figure 2B:
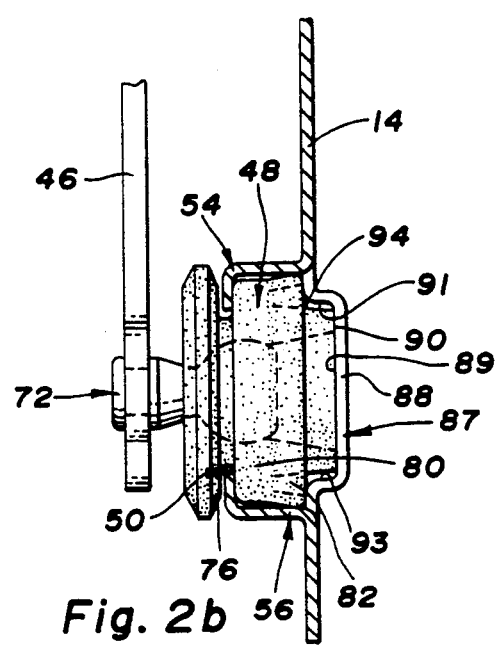
FIG. 2b is similar to FIG. 2A but shows the roller having been moved into engagement with the track as guided by the integral depression of the mounting panel.

Then, the installation of the roller (48) into the track is obtained as shown in FIG. 2b, by simply sliding the roller (48) along the panel portion (88) until the roller (48) enters the track (50) with the inturned flanges (60) and (66) entering the circumferential slot (76) of the roller.

Figure 4:
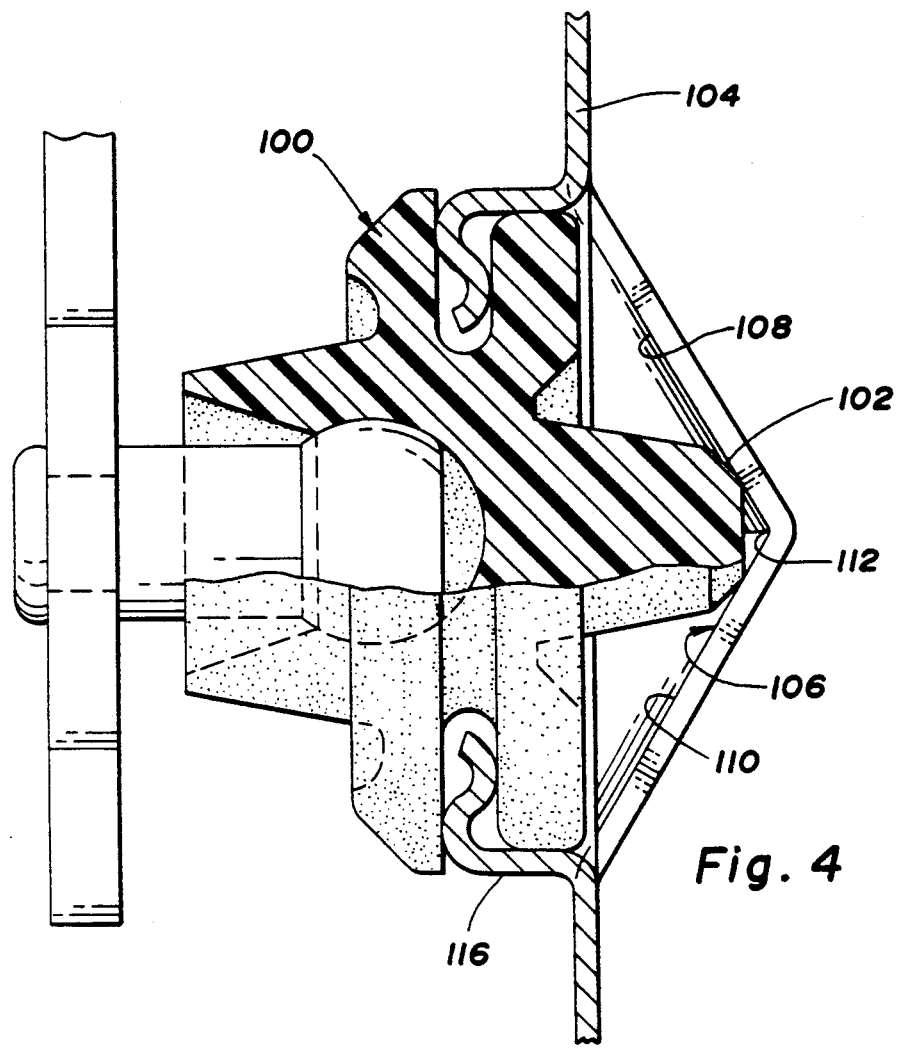
FIG. 4 is a view similar to FIG. 3 but showing a second embodiment of the invention.
Figure 5:
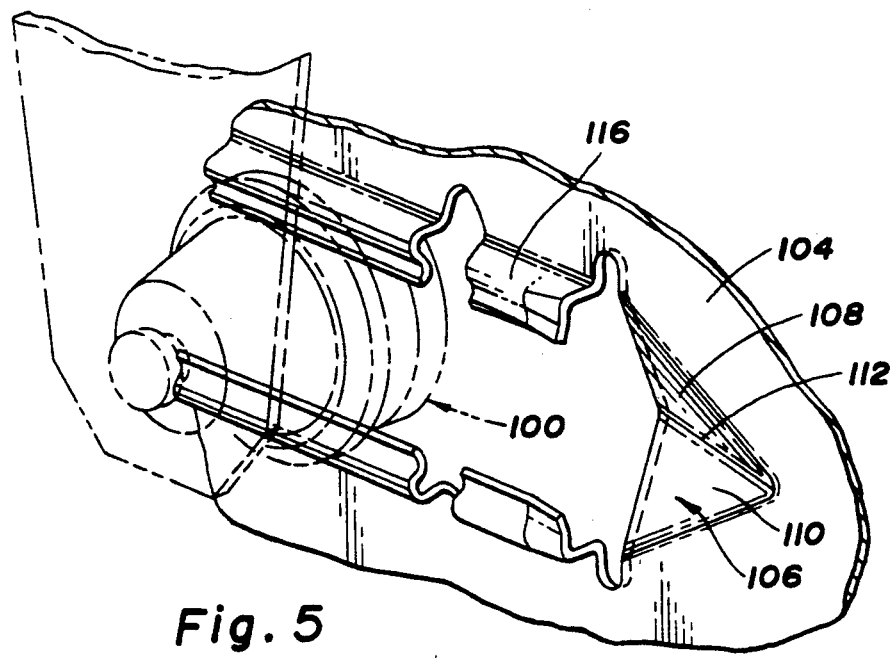
FIG. 5 is a perspective view showing the roller and the mounting panel of the second embodiment of FIG. 4.

FIGS. 4 and 5 show a second embodiment of the invention. Roller (100) has a conical-shaped end face (102) and the mounting panel (104) has a depression (106) of the V-shaped cross section. The depression (106) includes an upper surface (108) and lower surface (110) which join at apex (112). To install the roller into the track (116), the conical end face (102) is applied against the panel (104) and then guided into the depression (106). As the conical end face (102) is slid into the conical depression (106), the roller (100) is automatically guided into the precise cross-track and axial alignments which will cause the roller (100) to engage with the track (116) as shown in FIG. 4.

Thus, it is seen that the invention provides a new and improved vehicle door construction in which the assembly of the window regulator arm onto a track is facilitated.

We claim:

1. In a vehicle door having a mounting panel with a track formed therein by integral flanges struck from the panel, and a window regulator arm having a roller carried thereon for engaging with the track to permit movement of the roller along the panel, the improvement comprising:
    said track having an open end permitting entry of the roller into the track when the roller is aligned axially with the track;
    said roller having an end face; and
    said panel having an integral portion thereof underlying the open end of the track and being engaged by the end face of the roller to establish the roller in a position of axial alignment with the panel from which the roller may be entered into the open end of the track.

2. The vehicle door of claim 1 further characterized by the the roller having a circumferential extending guide face thereof and the integral portion of the panel underlying the open end of the track having walls therof adapted to engage with the circumferential extending face of the roller to establish the roller in a positon of cross-track alignment with the track so the roller may be entered into the open end of the track.

3. The vehicle door of claim 2 further characterized by the integral portion of the panel underlying the open end of the track being a cup-shaped depression struck into the panel and having side walls of the cup-shaped depression adapted to engage with a circumferential extending guide face of the roller to establish the roller in a positon of cross-track alignment with the track so the roller may be entered into the open end of the track.

4. The vehicle door of claim 2 further characterized by the roller having conical-shaped end face defining the circumferential extending face thereof and the integral portion of the panel underlying the open end of the track having a depression of V-shaped cross section defining walls therof adapted to be engaged by the conical-shaped end face of the roller to establish the roller in a position of cross-track and axial alignment with the track so the roller may be entered into the open end of the track.

* * * * *